Patented Oct. 11, 1927.

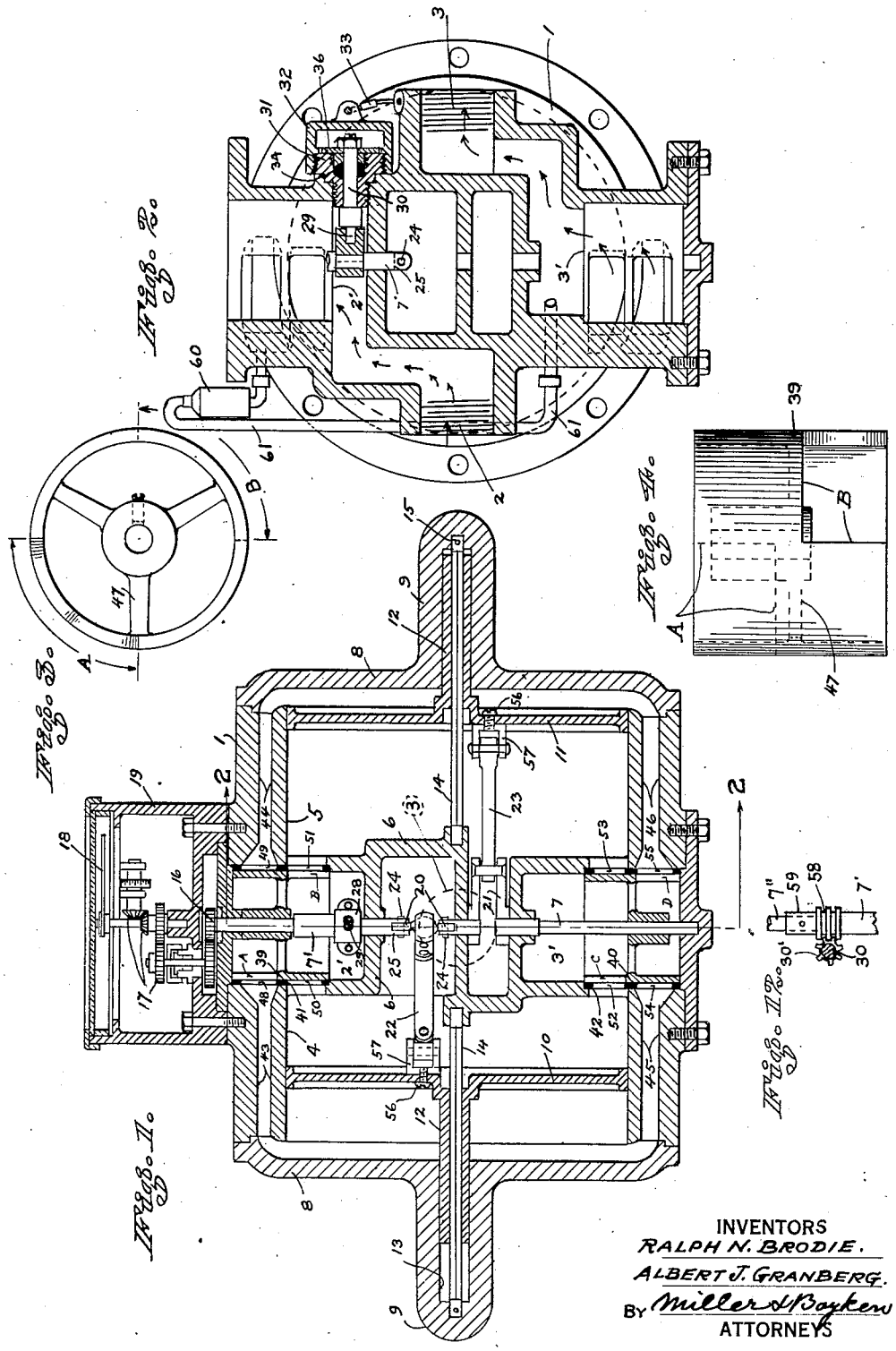

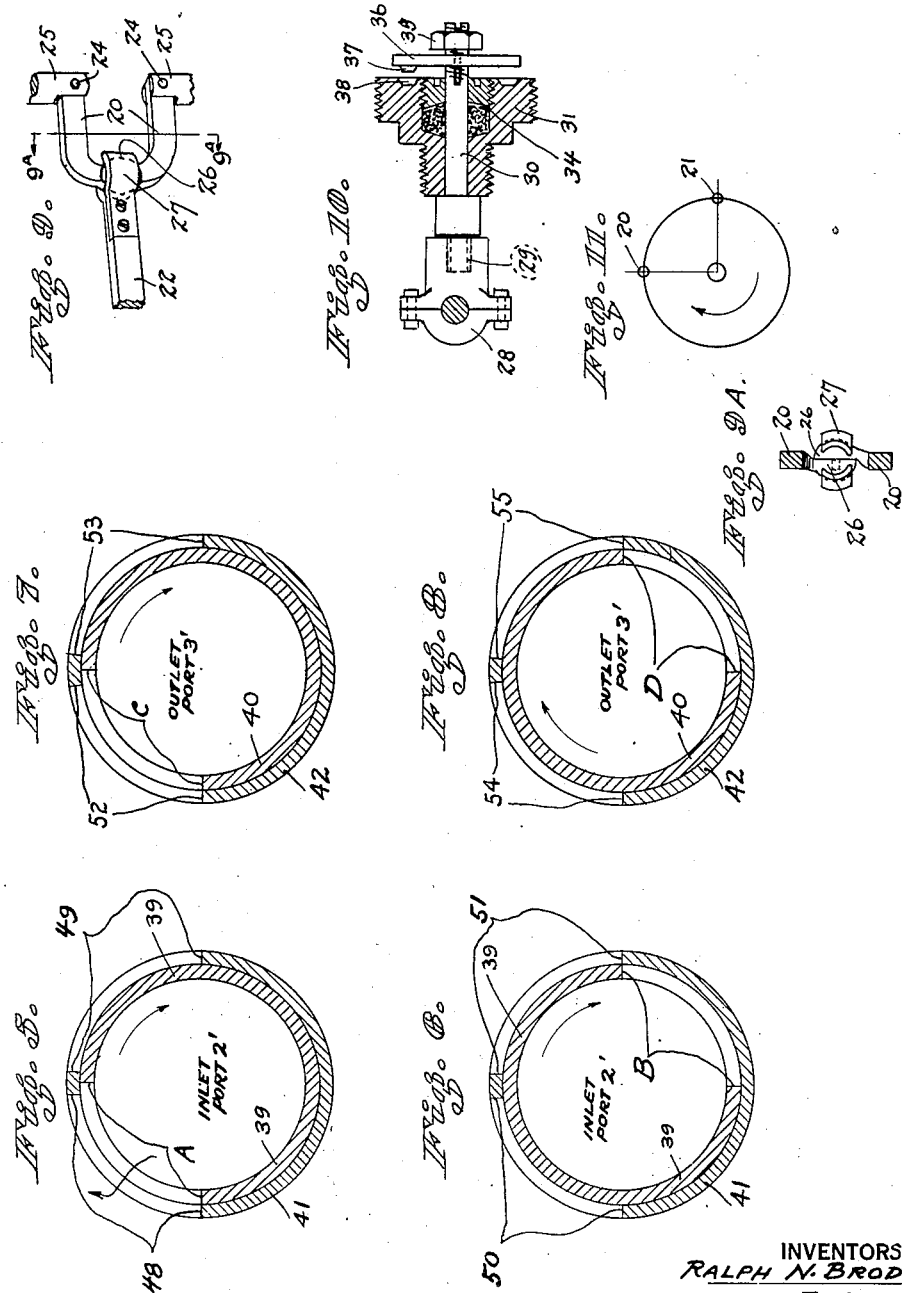

1,644,868

UNITED STATES PATENT OFFICE.

RALPH N. BRODIE, OF OAKLAND, AND ALBERT J. GRANBERG, OF BERKELEY, CALIFORNIA.

LIQUID METER.

Application filed October 25, 1926. Serial No. 143,870.

This invention relates to liquid measuring devices or meters such as used for the measuring of oils, gasoline and other liquids while flowing through the device, the device generally being made part of a piping system for the liquid.

The objects of the invention are to provide a device of this kind which will be operated by the flow of liquid therethrough, give a steady flow of liquid and provide for accurate adjustment of its operating capacity to definite standards whereby the recording dials of the device will register precisely the amount of fluid passing through the device, also such a device which will be unaffected by a reasonable amount of grit or foreign matter in the liquid measured. Other objects will appear from the detailed description following.

Briefly described our invention comprises a valve like body adapted to form a part of a pipe line, pistons within the body connected to a crank shaft, the pistons being moved back and forth by the flow of the liquid and thereby revolving the crank shaft to operate the registering dials, the crank being provided with a variable throw for adjusting the stroke of a piston to determine its displacement and consequently the capacity of the device, or quantity of liquid flowing therethrough upon each movement of the piston.

In the drawings accompanying this application Figure 1 is a vertical section taken through the center of the device. Figure 2 a transverse section of Figure 1 along the lines 2—2 thereof with the registering dial assemblage omitted and other features broken away. Figure 3 an enlarged plan view of one of the valves—Figure 4 an elevation of the same, Figures 5, 6, 7, 8 respectively plan sectional views of the four ported portions of the valves as operating in Figure 1, while Figures 9 and 9ᴬ are detached detailed respectively of the variable throw crank, and Fig. 10 the controlling means which determines the travel of one of the pistons. Figure 1 is a diagram of the crank action in relation to the valve positions shown in Figures 5, 6, 7, and 8, and Fig. 12 is a detail showing an optional construction to that of Fig. 10.

In further detail the device comprises a hollow ported body 1 adapted for securing to inlet and outlet pipes as respectively indicated by the threaded ports 2 and 3, and provided with two piston chambers or cylinders 4 and 5 respectively, one each at opposite sides of partitioning 6 which separates the cylinder from direct communication and rotatably supports a crank shaft comprising an upper portion 7' and a lower portion 7.

Each cylinder is closed at its outer end by a cap or head 8 formed with a central boss 9 and within each cylinder is a piston as at 10 and 11. These pistons if accurately made need not have piston rings as the device usually operates under low pressure, and the pistons being very narrow are each provided with hubs as at 12 slidably supporting the piston in a guiding bore 13 in the boss 9 as well as being slidable on a rod 14 extending through the hub and having its ends supported in the partition 6 and boss 9, and as one means of splining the hub 12 so that the piston will not revolve the rod 14 is here indicated as being of square or hexagon section slidably working in a similarly shaped hole in the piston hub, the extreme ends of the rod being round where they are supported and the outer end pinned at 15 to prevent rotation, but of course any other spline arrangement may be used which will permit free sliding of the pistons without rotation.

The crank shaft is suitably geared as at 16 at the upper end of its upper portion 7' to any preferred form of registering mechanism 17 provided with an indicator 18 all enclosed in a suitable housing as at 19 not specifically forming part of the invention, and the shaft is provided with two cranks 20, 21 set at 90 degrees respectively pivotally connected by rods 22, 23 to the pistons 10 and 11.

The connections of the rods 22 and 23 to the respective pistons is to one side of the center as shown so as to clear the guide rods 14.

One of the cranks as at 21 may be formed integral with the shaft or firmly secured thereto, but the other crank is of special construction to permit altering its throw, and comprises a pair of arms 20 each pivoted at 24 between the bifurcated ends 25 of the shaft, and the outer ends of the arms 20 each terminating in a half ball 26 pinned transversely between a pair of socket shells 27 at the outer end of the connecting rod 22.

By this construction it is manifest that a spreading of the inner ends of the arms 20 will draw the outer ends toward the shaft and thus shorten the crank, or a reverse operation will increase the throw of the crank.

To effect such a control of the crank 20 several means suggest themselves, and one of which is indicated in Figures 2 and 10 consists of a collar 28 revolvably embracing a reduced neck on the upper portion 7' of the shaft and which collar is engaged by an eccentric pin 29 extending from a spindle 30 extending through a removable bushing 31 at one side of the body 1 and covered over by a threaded cap 32 provided with means for sealing it by an inspector of weights and measures as at 33 to a lug on the body.

The nut 31 is formed with a stuffing box 34 to keep the spindle tight and a nut 35 at the outer end of the spindle provides for clamping a washer 36 against the face of bushing 31. The washer 36 being splined to the spindle and provided with a detent as at 37 adapted to seat in any of a row of depressions as at 38 formed around the face of the bushing, thus upon releasing the nut 35 the spindle may be revolved to any desired position and locked in place. The hole in collar 28 for pin 29 is slightly elongated to prevent binding of the eccentrically projecting pin in revolving the spindle 30, tho very little adjustment is ever required as it is contemplated that the capacity of the cylinders be carefully determined by accurate work at the time of manufacture.

An optional adjustment of the upper portion 7' of the shaft is shown in Figure 12 wherein the spindle 30 has gear teeth 30' formed at its inner end engaging teeth 58 around a loose collar below a collar 59 secured to the reduced neck 7'' of the shaft, the spindle being supported at its inner end for revolution by any suitable bearing not shown.

Concentric with the shaft 7 the body is bored as at 2' and 3' to house upper and lower circular rotary valves 39 and 40 respectively.

These valves 39 and 40 are secured to the crank shaft 7—7' so as to revolve with it, and they revolve respectively in cages 41 and 42 ported to the cylinders 4 and 5 and to passageways 43, 44, 45 and 46 leading to the rear of the pistons in the cylinders, while the valves themselves being hollow cylindrical shells supported on spider arms as at 47 in Figure 3 form the main passageways for liquid from the inlet 2 and to the outlet 3 so that the liquid entering the meter from 2 passes into the bore 2' and through the upper or inlet valve 39 for distribution to the cylinders in proper timed relation to the movement of the pistons, and the liquid passing from the cylinder discharges through the lower or outlet valve 40 into the bore 3' and to the outlet 3.

The valves 39 and 40 have quarter circle ports cut from their shells to coincide at various portions of the revolutions of the valves with corresponding ports in the cages 41—42, the valve ports being indicated as A—B—C and D and the cooperating pairs of cage ports 48, 49, 50, 51, 52, 53, 54, 55.

The plan sections of the valves Figures 5, 6, 7, 8 taken through these various ports considered in relation to the crank diagram Figure 11 shows the various opening and closing of the ports to discharge to and from opposite sides of both pistons along the passageways and paths shown in Figure 1.

An air release valve 60 of any suitable design is tapped into a high part of one of the inlet ports as indicated in Fig. 2 and a pipe 61 extended from the valve to the outlet port of the meter so that any accumulated or separated air or gas from the liquid being measured will by-pass through the air release valve back again into the liquid after the same has been measured so that the liquid will be measured but not its free gas or air.

In operation the liquid entering either cylinder through ports 48, 49, 50, 51 successively moves the pistons from opposite sides and meets a substantially straight drop to the bottom of the cylinder so that any heavy foreign particles may fall straight down to the discharge ports 52, 53, 54, 55 for ultimate ejection therefrom without being dragged across the cylinder walls to score the same, and the 90 degrees setting of the pistons insures the absence of a dead center, while the position of the quarter circle ports in the valves insures a constant flow since one decreases in area at the same rate of speed as the next in operation increases and one closes precisely as the preceding one opens.

As a structural feature of the device the removable heads 8 are important in providing quick access to the connecting rods, cranks and valves, as the pistons may easily be drawn out of the cylinders upon removing the screws 56 which secure the pivoted connecting rod bearings 57 thereto.

It is of course apparent without further illustrations that details of the device may be considerably varied while maintaining the described operation, and that any number or size of pistons may be employed.

We claim:

1. A liquid meter including a body with a cylindrical chamber therein, a piston movable within the chamber, a crank shaft rotatably supported by the body and a rod connecting the piston to the crank, means whereby the throw of the crank may be varied, valve means operated by the shaft adapted for admitting and releasing a liquid to and from the cylinder for operating said piston, and means for tallying the movements of the piston for thereby registering the liquid passing into the cylinder.

2. A structure as specified in claim 1 wherein a second cylinder and piston are arranged as described in opposed relation with and to cooperate with the first mentioned piston and valve means, the crank shaft provided with a separate crank for the second piston and of one piston only being provided with the means whereby its throw may be adjusted.

3. In a liquid meter provided with a reciprocatory measuring piston, a crank shaft, a rod pivotally connected to the crank and to the piston for revolution of the shaft by reciprocation of the piston, and means whereby the effective throw of the crank may be varied to thereby vary the capacity stroke of the piston.

4. In a liquid meter provided with a reciprocatory measuring piston, a crank shaft, a rod pivotally connected to the crank and to the piston for revolution of the shaft by reciprocation of the piston, and means whereby the effective throw of the crank may be varied to thereby vary the capacity stroke of the piston, said means comprising a pivotal mounting of the crank arms on the shaft and the rod, and control mechanism adapted for spreading the arms at the shaft for retracting the rod ends of the arms.

5. In a liquid meter provided with a reciprocatory measuring piston, a crank shaft, a rod pivotally connected to the crank and to the piston for revolution of the shaft by reciprocation of the piston, and means whereby the effective throw of the crank may be varied to thereby vary the capacity stroke of the piston, said means comprising a pivotal mounting of the crank arms on the shaft, and the rod ends of the arms being formed each into half of a ball joint seated in the rod.

6. In a structure as specified in claim 4 said central mechanism including a collar on a section of the crank shaft and a spindle at right angles thereto provided with an eccentric engaging the collar and arranged for shifting the same and the shaft upon rotation of the spindle.

7. In a structure as specified in claim 4 said control mechanism including a collar on a section of the crank shaft, and a spindle at right angles thereto provided with an eccentric engaging the collar and arranged for shifting the same and the shaft upon rotation of the spindle, means for adjusting said spindle to degrees of rotation, and means for sealing the spindle against unauthorized adjustment.

8. A liquid meter comprising a housing provided with two aligned cylinders in horizontal opposed relation and inlet and outlet ports for said cylinders, a piston in each cylinder, a vertically disposed double throw crank shaft revolvably supported by the housing intermediate said cylinders, a connecting rod from each piston to a throw of said crank shaft, cylindrical valves carried by the shaft adjacent the upper and lower sides of the cylinders ported to the cylinders and cooperating with the ports in the housing for admitting liquid from the upper valves to the cylinders for operation of the pistons in sequence and for discharging the liquid from the lower valves.

9. A structure as specified in claim 8 wherein said shaft is provided with cranks set at 90 degrees of arc respectively operating the pistons and said valves are cylindrical shells rotating with said shaft and ported in alternation to opposite ends of said pistons.

RALPH N. BRODIE.
ALBERT J. GRANBERG.